United States Patent [19]

Tamura et al.

[11] Patent Number: 4,994,726
[45] Date of Patent: Feb. 19, 1991

[54] POWER SUPPLY APPARATUS FOR CHARGING-TYPE DEVICE

[75] Inventors: Kozo Tamura; Syoichi Nihira; Yasuhiro Tsukamoto; Akira Iida, all of Hitachi, Japan

[73] Assignees: Hitachi Ltd., Tokyo; Tagasangyo, Ltd., Ibaraki, both of Japan

[21] Appl. No.: 255,833

[22] Filed: Oct. 11, 1988

[30] Foreign Application Priority Data

Oct. 12, 1987 [JP] Japan .................. 62-254552

[51] Int. Cl.⁵ .................. H01M 10/46; H02J 7/02
[52] U.S. Cl. .................. 320/2; 320/54
[58] Field of Search .................. 320/2, 54, 56, 32

[56] References Cited

U.S. PATENT DOCUMENTS

| | | | |
|---|---|---|---|
| 3,317,810 | 5/1967 | Inoue | 320/56 |
| 3,414,796 | 12/1968 | Henquet | 320/54 X |
| 3,729,637 | 4/1973 | Gray | 320/56 X |
| 3,898,547 | 8/1975 | Poole | 320/2 |
| 4,161,661 | 7/1979 | Dwinell | 307/119 |
| 4,684,825 | 8/1987 | Sachs | 307/238 |

FOREIGN PATENT DOCUMENTS 62-120829 6/1987 Japan .

Primary Examiner—R. J. Hickey
Attorney, Agent, or Firm—Antonelli, Terry, Stout & Kraus

[57] ABSTRACT

There is provided a power supply apparatus for charging-type device including a transformer disposed in a main body of the power supply apparatus, current supply connection terminals connected to a secondary winding of the transformer, current receiving connection terminals so disposed in a charging-type device as to be capable of being coupled to and detached from the current supplying connection terminals, a storage battery so disposed in the charging-type device as to be charged from the current receiving connection terminals, and a load connected to the storage battery, the power supply apparatus for charging-type device comprising relay contacts of a relay connected to a primary side of a primary winding of the transformer, short-circuit contacts for the relay contacts, a relay coil for opering and closing the relay contacts, a first connection control terminal connected to the relay coil, and a second connection control terminal capable of being coupled and detached from the first connection control terminal, the relay coil being connected to a secondary side of secondary winding of the transformer via the first and second control terminals to interrupt a current flowing through the transformer upon completion of battery charging and upon detachment of the charging-type device from the main body of the power supply apparatus.

8 Claims, 4 Drawing Sheets

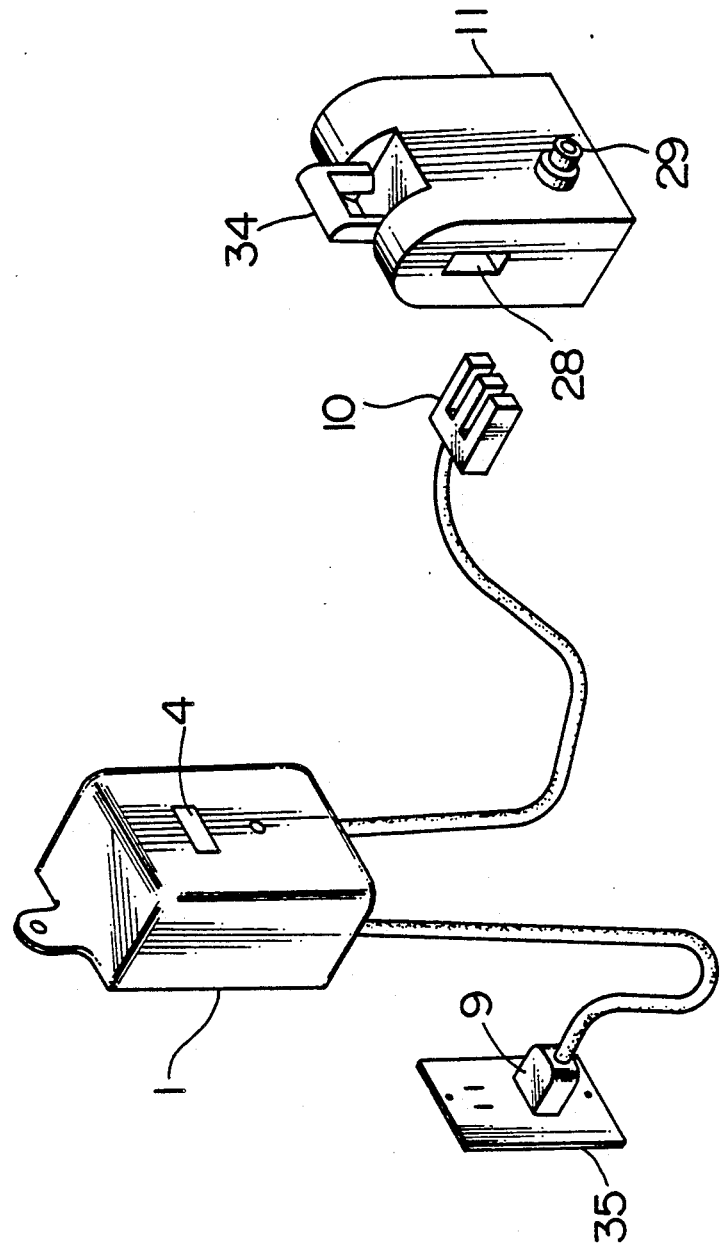

POWER SUPPLY APPARATUS FOR CHARGING-TYPE DEVICE

BACKGROUND OF THE INVENTION

1. Field of the Invention

The present invention relates to a apparatus for a charging-type device such as a power supply charging-type massaging device for use in the bath or a charging-type submersible pump.

2. Description of the Prior Art

In a conventional power supply apparatus as described in U.S. Pat. No. JP-A-62-120829, a main body of power supply apparatus includes a transformer therein and current supplying connection terminals connected to a secondary winding of the transformer, and a charging-type device includes current receiving connection terminals, which can be coupled to and detached from the current supplying connection terminals, a storage battery charged from the current receiving connection terminals, and a load connected to the storage battery.

In such a power supply apparatus a current flows through a primary winding of the transformer such that charging to the storage battery has been finished or the charging-type device is detached from the main body of the power supply apparatus. Therefore, heat is generated by the primary winding which results in a fear of wire breakage.

SUMMARY OF THE INVENTION

The present invention is based upon the above described point.

In accordance with a first feature of the present invention, a power supply apparatus for a charging-type device including a transformer disposed in a main body of the power supply apparatus, current supply connection terminals connected to a secondary winding of the transformer, current receiving connection terminals so disposed in a charging-type device as to be capable of being coupled to and detached from the current supplying connection terminals, a storage battery so disposed in the charging-type device as to be charged from the current receiving connection terminals, and a load connected to the storage battery comprises relay contacts of a relay connected to a primary side of a primary winding of the transformer, short-circuit means for the relay contacts, a relay coil for opening and closing the relay contacts, a first connection control terminal connected to the relay coil, a second connection control terminal so disposed in the charging-type device as to be capable of being coupled to and detached from the first connection control terminal, the relay coil being connected to a secondary side of the transformer via the first and second control terminals, and charging end control means connected to the charging-type device of the relay coil circuit.

In accordance with a second feature of the present invention, a power supply apparatus for a charging-type device including a transformer disposed in a main body of the power supply apparatus, current supply connection terminals connected to a secondary winding of the transformer, current receiving connection terminals so disposed in a charging-type device as to be capable of being coupled to and detached from the current supplying connection terminals, a storage battery so disposed in the charging-type device as to be charged from the current receiving connection terminals, and a load connected to the storage battery, comprises relay contacts of a relay connected to a primary side of a primary winding of the transformer, short-circuit means for the relay contacts, a relay coil for opening and closing the relay contacts, one end of the relay coil being connected to a secondary winding of the transformer, a first connection control terminal connected to the other end of the relay coil, a second connection control terminal so disposed in the charging-type device as to be capable of being coupled to and detached from the first connection control terminal, the relay coil being connected to a secondary winding of the transformer via the first and second control terminals, and charging end control means connected to the charging-type device of the relay coil circuit.

In such a power supply apparatus for a charging-type device, the relay contacts are closed and self-held in the closed state by closing the short-circuit means. When charging of the storage battery is finished, the charging end control means interrupts the current flowing through the relay coil to open the relay contacts. It is thus possible to prevent the primary winding of the transformer from generating heat for a long time. Further, the current flowing through the relay coil is interrupted to open the relay contacts by detaching the charging-type device from a connector located at the main body side of the power supply apparatus to disconnect the connection terminals of the charging-type device from the connection terminals of the main body side of the power supply apparatus. It is thus possible to prevent the primary winding of the transformer from generating heat for a long time. From these points, it is possible to prevent the winding of the transformer from breaking, resulting in improved reliability.

Further, one end of the relay coil is connected to the secondary winding of the transformer, while the other end of the relay coil is connected to the control connection terminal, and the charging end control means is connected to the charging-type device side of the circuit of the relay coil. Therefore, the relay coil can be controlled by disposing a pair of control connection terminals between the main body side of the power supply apparatus and the charging-type device side. As a result, the configuration can be significantly simplified.

BRIEF DESCRIPTION OF THE DRAWING

FIG. 5 is an oblique view of the charging-type device.

DESCRIPTION OF THE PREFERRED EMBODIMENT

Figure 1:
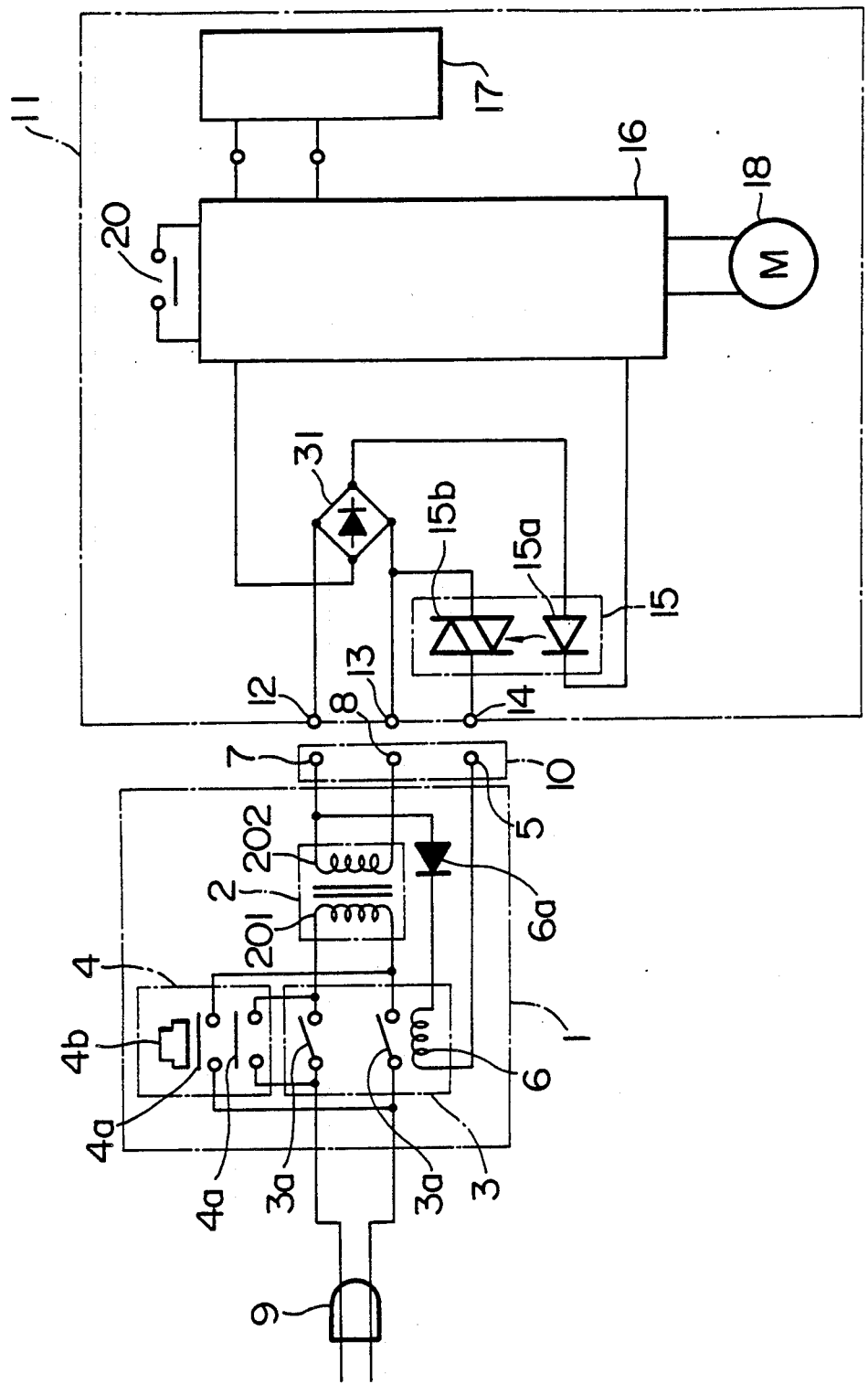
FIG. 1 is an electric circuit diagram of a charging-type device according to the present invention.
Figure 2:
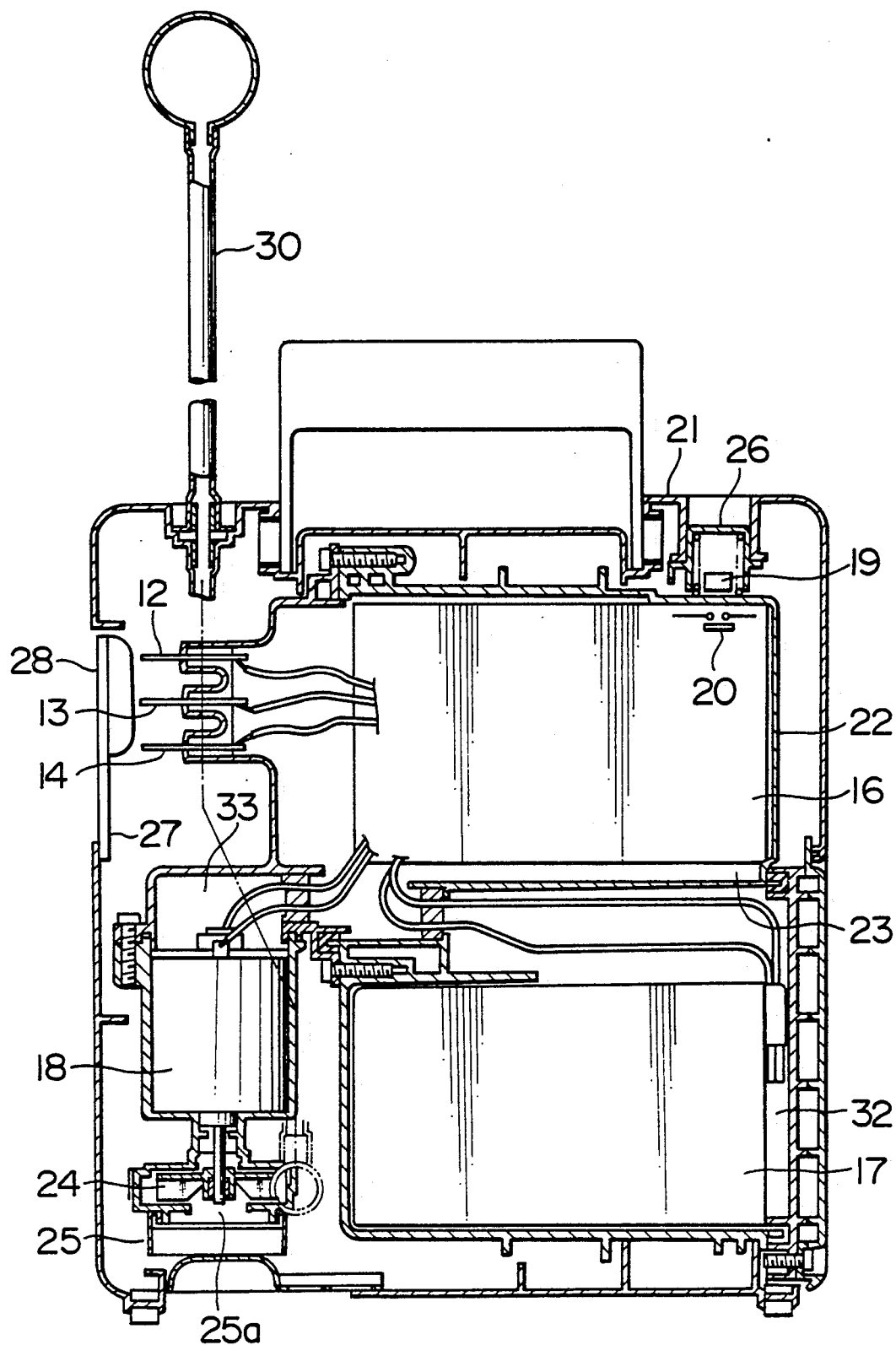
FIG. 2 is a sectional view of the charging-type device.
Figure 3:
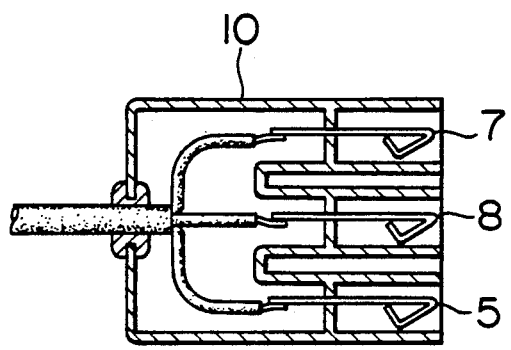
FIG. 3 is a sectional view of a connector portion of the charging-type device.
Figure 4:
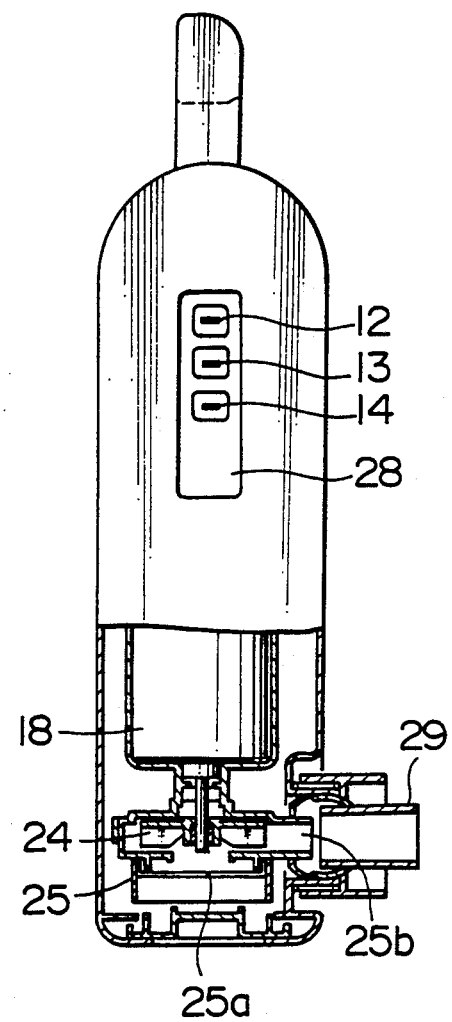
FIG. 4 is a side view of the charging-type device, partially including a sectional view thereof.

An embodiment of the present invention will now be described by referring to FIGS. 1 to 5. A main body 1 of power supply apparatus has a transformer 2 therein. Relay contacts 3a are connected to the primary side of a primary winding 201 of the transformer 2. A power supply plug 9 is connected to the primary side of the relay contacts 3a. The plug 9 is connected to a power supply receptacle 35. A short-circuit means 4 having short-circuit contacts 4a capable of short-circuiting the relay contacts 3a is provided. This short-circuit means 4 is so configured that the relay contacts 3a may be short-circuited by the short-circuit contacts 4a only while a push button 4b is depressed. A relay coil 6 for opening and closing the relay contacts 3a is provided. A relay 3 comprises the relay contacts 3a and the relay coil 6. The relay contacts 3a are closed when a current flows through the relay coil 6, and the relay contacts 3a are opened when no current flows through the relay coil 6. The secondary winding 202 of the transformer 2 is connected to current supplying connection terminals 7 and 8. The current supplying connection terminals 7 and 8 are contained in a connector 10. One end of the relay coil 6 is connected to the secondary winding 202 of the transformer 2 via a diode 6a. The other end of the relay coil 6 is connected to a control terminal 5 contained in the connector 10. The power supply plug 9, the power supply apparatus main body 1 and the connector 10 are configured respectively separately and connected by leads to constitute the main body side of the power supply apparatus.

In a charging-type device 11 constituting a charging-type massaging device for use in bath, current receiving connection terminals 12 and 13, which can be coupled to and detached from the above described current supplying connection terminals 7 and 8 respectively, and a control connection terminal 14, which can be coupled to and detached from the above described control connection terminal 5, are provided. A rectifying circuit 31 is connected to the current receiving connection terminals 12 and 13. A charging/discharging control circuit 16 is connected to the rectifying circuit 31 via a light emitting element 15a of a charging end control means 15 comprising a photo-TRIAC. The control connection terminal 14 is connected to the current receiving connection terminal 13 via a photodetector element 15b of the charging end control means 15. A battery 17 is connected to the charging/discharging control circuit 16 and supplied with a current from the above described rectifying circuit 31. Further, a load 18 comprising a motor is connected to the charging/discharging control circuit 16 and controlled by a reed switch 20.

In the charging-type device 11, a bulkhead 22 is provided inside a main body case 21. This bulkhead 22 forms an air compartment 23 in the upper part and a bottery compartment 32 and a motor housing compartment 33 in the lower part. The air compartment 23 is provided to lighten the weight of the charging-type device 11 in water. This air compartment is used to house the charging/discharging control circuit 16 and the reed switch 20 therein. A push button 26 containing a magnet 19 therein is so attached to a main body case 21 as to face the reed switch 20. In a side face of the main body case 21, an opening 28 which can be opened and closed by a slide cover 27 is formed. The three connection terminals 12, 13 and 14 are so disposed as to face the opening 28 and pierce the bulkhead 22. The storage battery 17 is housed in the battery compartment 32. The motor 18 is housed in the motor housing compartment 33. The air compartment 23, the battery compartment 32 and the load housing compartment 33 are sealed at outside or boundaries between them. An impeller 24 is attached to the axis of rotation of the load 18 to form a pump section 25. The pump section 25 has a suction opening 25a in its lower face and a discharge opening 25b in its side face. In the front face of the main body case 21, a discharge opening 29 communicating with the above described discharge opening 25b is formed. A rotatable handle 34 is attached to the upper face of the main body case 21. An air tube 30 communicates with the discharge side of the pump section 25.

When the push button 4b of the short-circuit means 4 is depressed to close the short-circuit contacts 4a, a current flows through the primary winding 201 of the transformer to induce voltage on the secondary winding. If the connection terminals 7 and 8 are coupled to the connection terminals 12 and 13, respectively, a current flows to the charging/discharging control circuit 16 via the rectifying circuit 31 and the light emitting element 15a, and a current is supplied to the storage battery 17. Since the current flows through the light emitting element 15a, the element 15a emits light. When the photodetector element 15b receives the light, a current flows through the relay coil 6 to close the relay contacts 3a. Even if the push button 4b ceases to be depressed and its short-circuit contacts 4a are opened, therefore, a current continues to be supplied to the transformer 2. When charging of the storage battery is finished, the current ceases to flow through the light emitting element 15a. Since the light emission thus ceases, the current flowing through the photodetector element 15b is interrupted and hence the current flowing through the relay coil 6 is also stopped. Accordingly, the relay contacts 3a are opened to stop the current flowing through the transformer 2. If the connection terminals 7, 8 and 10 are respectively detached from the connection terminals 12, 13 and 14, the current flowing through the relay coil 6 is stopped even under the state that the storage battery is being charged.

It is possible to let a current flow to the load 18 by closing the reed switch 20. For letting a current flow through the load 18, the charging-type device 11 is put into a bath and the reed switch 20 is closed. When a current flows through the load 18, the impeller 24 is rotated and the pump section 25 is run to such suck water of the bath through the suction opening 25a and discharge it through the discharge opening 25b. At this time, air is sucked from the outside of bath through an air tube 30 and ejected as a bubble flow, resulting in a massage effect.

In such a power supply apparatus the relay contacts 3a are closed and held in the closed state by closing the short-circuit means 4. When charging of the storage battery 17 is finished, the charging end control means 15 interrupts the current flowing through the relay coil 6 to open the relay contacts 3a. It is thus possible to prevent the primary winding 201 of the transformer 2 from generating heat for a long time. Further, the current flowing through the relay coil 6 is interrupted to open the relay contacts 3a by detaching the charging-type device 11 from the connector 10 located at the main body side of the power supply apparatus to disconnect the connection terminals 7, 8 and 5 from the connection terminals 12, 13 and 14. It is thus possible to prevent the primary winding 201 of the transformer 2 from generating heat for a long time. Thus, it is possible to prevent the winding of the transformer 2 from breaking, resulting in improved reliability.

Further, one end of the relay coil 6 is connected to the secondary winding 202 of the transformer 2, while the other end of the relay coil 6 is connected to the control connection terminal 5, and the charging end control means 15 is connected to the charging-type device 11 side of the circuit of the relay coil 6. Therefore, the relay coil 6 can be controlled by disposing a pair of control connection terminals 5 and 14 between the main body 1 side of power supply apparatus and the charging-type device 11 side as the circuit of the relay coil 6. As a result, the configuration can be significantly simplified.

The present invention thus provides a power supply apparatus for a charging-type device having high reliability and simple configuration.

We claim:

1. A power supply apparatus for charging-type device including a transformer disposed in a main body of the power supply apparatus, current supply connection terminals connected to a secondary winding of the transformer, current receiving connection terminals so disposed in a charging-type device as to be capable of being coupled to and detached from the current supplying connection terminals, a storage battery so disposed in the charging-type device as to be charged from said current receiving connection terminals, and a load connected to said storage battery, said power supply apparatus for charging-type device comprising:
   relay contacts of a relay connected to a primary side of a primary winding of said transformer;
   short-circuit means for said relay contacts;
   a relay coil for opening and closing the relay contacts;
   a first connection control terminal connected to said relay coil; and
   a second connection control terminal so disposed in said charging-type device as to be capable of being coupled and detached from said first connection control terminal, said relay coil being connected to a secondary side of a secondary winding of said transformer via said first and second control terminals.

2. A power supply apparatus for charging-type device according to claim 1, wherein said short-circuit means is so configured that the relay contacts may be short-circuited by short-circuit contacts only while a push button is depressed.

3. A power supply apparatus for charging-type device according to claim 1, wherein the current supplying connection terminals and the first connection control terminal are contained in a connector, and the main body of power supply apparatus and the connector are constituted separately and connected by way of leads.

4. A apparatus comprising:
   a power supply having a main body and a transformer contained within said main body;
   a charging-type device detachably connected with said power supply and including a storage battery, a plurality of current receiving connection terminals and a recitfying circuit, said plurality of current receiving connection terminals receiving power from said transformer to enable charging of said storage battery through said rectifying circuit; and
   means for opening a primary side of said transformer upon detachment of said power supply from said charging-type device;
   wherein said charging-type device further includes switch means for controlling said means for opening a primary side of said transformer.

5. A power supply apparatus for charging-type device including a transformer disposed in a main body of the power supply apparatus, current supply connection terminals connected to a secondary winding of the transformer, current receiving connection terminals so disposed in a charging-type device as to be capable of being coupled to and detached from the current supplying connection terminals, a storage battery so disposed in the charging-type device as to be charged from said current receiving connection terminals, and a load connected to said storage battery, said power supply apparatus for charging-type device comprising:
   relay contacts of a relay connected to a primary side of a primary winding of said transformer;
   short-circuit means for said relay contacts;
   a relay coil for opening and closing the relay contacts, one end of said relay coil being connected to a secondary winding of said transformer;
   a first connection control terminal connected to the other end of said relay coil;
   a second connection control terminal so disposed in said charging-type device as to be capable of being coupled and detached from said first connection control terminal, said relay coil being connected to a secondary side of a secondary winding of said transformer via said first and second control terminals; and
   charging end control means connected to the charging-type device of the relay coil circuit.

6. A power supply apparatus for charging-type device according to claim 5, wherein said charging end control means comprises a photo TRIAC having a photodetector element connected to the circuit of the first connection control terminal and a light emitting diode connected to a charging/discharging control circuit.

7. A power supply apparatus for charging-type device according to claim 5, wherein said charging-type device comprises the storage battery and a pump section connected to a motor.

8. A power supply apparatus for charging-type device according to claim 6, wherein the load is connected to the charging/discharging control circuit.

* * * * *